United States Patent [19]
Barcza

[11] Patent Number: 5,232,158
[45] Date of Patent: Aug. 3, 1993

[54] CONVERGENT/DIVERGENT NOZZLE WITH SEAL CENTERING

[75] Inventor: W. Kevin Barcza, Stuart, Fla.

[73] Assignee: United Technologies Corporation, Hartford, Conn.

[21] Appl. No.: 925,440

[22] Filed: Aug. 11, 1992

[51] Int. Cl.$^5$ .................... B64C 15/02; F02K 1/12
[52] U.S. Cl. ................... 239/265.35; 239/265.39; 239/265.41; 60/230; 60/232
[58] Field of Search .............. 239/265.35, 265.37, 239/265.39, 265.41; 244/52; 60/228, 230, 232

[56] References Cited

U.S. PATENT DOCUMENTS

| | | | |
|---|---|---|---|
| 2,796,731 | 6/1957 | Morley et al. | 239/265.39 X |
| 2,846,844 | 8/1958 | O'Rourke | 239/265.35 X |
| 3,004,385 | 10/1961 | Spears, Jr. et al. | 239/265.41 |
| 3,095,695 | 7/1963 | Gaubatz et al. | 239/265.41 |
| 3,288,374 | 11/1966 | Colville | 239/265.41 |
| 3,426,974 | 2/1969 | Pendoley, Jr. et al. | 239/265.39 |
| 3,715,079 | 2/1973 | Thompson | 239/265.37 X |
| 3,786,992 | 1/1974 | Robinson | 239/265.39 |
| 3,873,027 | 3/1975 | Camboulives et al. | 239/265.39 X |
| 4,994,660 | 2/1991 | Hauer | 239/265.41 |
| 5,039,014 | 8/1991 | Lippmeier | 239/265.39 |
| 5,076,496 | 12/1991 | Lippmeier | 239/265.41 |
| 5,082,182 | 1/1992 | Bruchez | 239/265.35 |

Primary Examiner—Andres Kashnikow
Assistant Examiner—William Grant
Attorney, Agent, or Firm—Edward L. Kochey, Jr.

[57] ABSTRACT

A divergent seal is located on the gas side of a convergent/divergent nozzle between adjacent divergent flaps. A scissors linkage both centers the seal between the flaps and restrains the seal against the flaps.

7 Claims, 4 Drawing Sheets

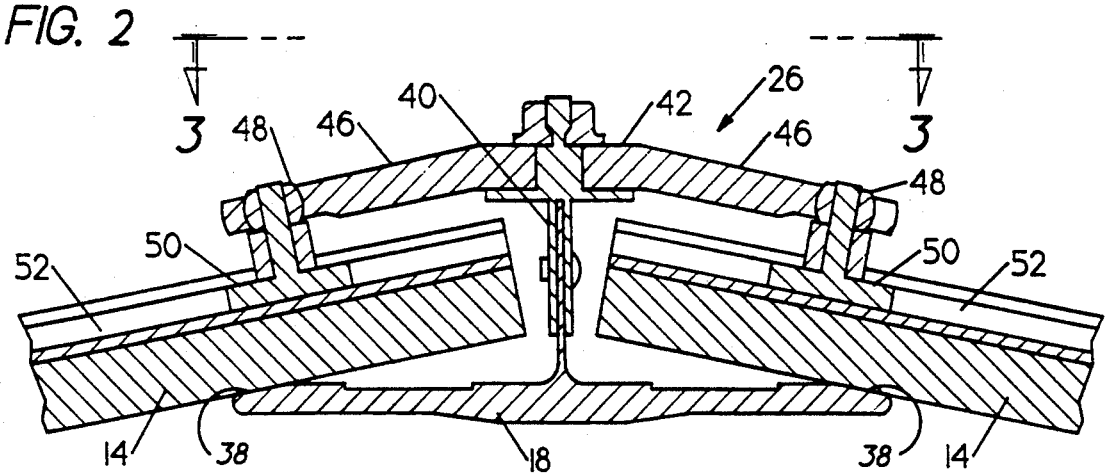
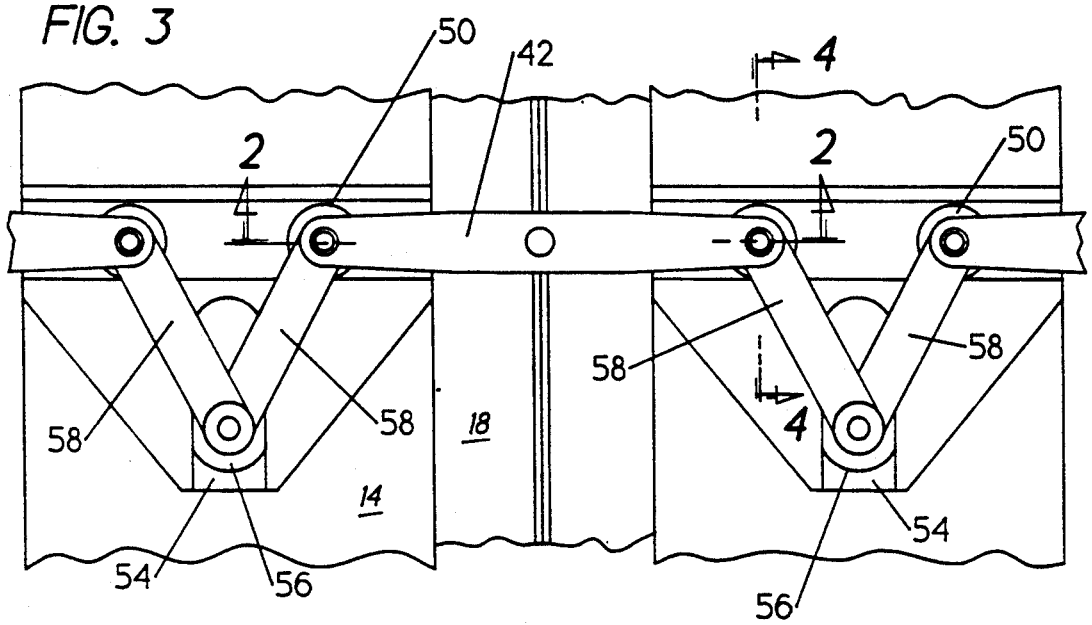
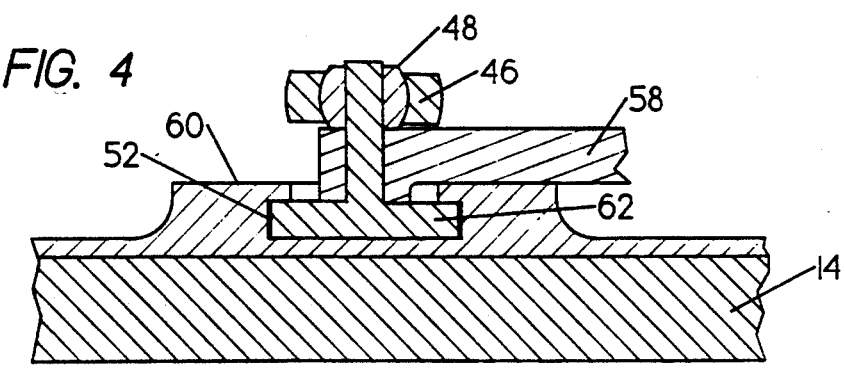

CONVERGENT/DIVERGENT NOZZLE WITH SEAL CENTERING

The Government has rights in this invention pursuant to a contract awarded by the Department of the Air Force.

TECHNICAL FIELD

The invention relates to gas turbine engines and in particular to vectorial discharge nozzles therefor.

BACKGROUND OF THE INVENTION

Gas turbine engines for aircraft achieve thrust by discharging hot gases through the exhaust nozzle. Efficient operation for multi-mission application dictates the use of variable area convergent/divergent nozzles.

Variable convergent/divergent configuration is achieved in axisymmetric nozzles by the use of a plurality of circumferentially arranged flaps. Overlapping seals are located between adjacent flaps.

The hinge arrangement must be provided between each convergent flap or seal and each divergent flap or seal. Variations may be made during operation, of the throat and terminal discharge openings.

Increased maneuverability of the aircraft can be accomplished by thrust vectoring. Here the discharge of gas is vectored from the axial direction to achieve a thrust component which is up, down or sideways. As shwon in U.S. Pat. No. 5,082,182 (Bruchez et al, issued Jan. 21, 1992) the vectoring may be accomplished by vectoring movement of the divergent flaps and seals only. The convergent flaps and seals remain symmetrical.

The hinges between the convergent and divergent flap must be capable of rotation around both the radial axis and lateral axis of the hinge. The divergent seal must also maintain a seal against both adjacent flaps at all times to prevent leakage of the hot gas stream and loss of thrust.

During vectoring all of the divergent flaps move in the same direction (i.e. upwardly, to the right, etc.). The divergent flaps thereby become radially offset toward the trailing edges. The seal must be able to maintain contact with these flaps throughout that movement. The seal must be able to twist axially through an angle on the order of 20 degrees from the upstream end to the downstream end in order to maintain this contact, particularly at large nozzle throat areas.

The divergent seal centering device must keep the divergent seal centered between adjacent divergent flaps at large nozzle areas. This must occur whether the nozzle is axial or vectored. Accordingly, the device must tolerate the axial and radial offsets between the divergent flaps when vectored.

The divergent seal restraining device must support the divergent seal at all conditions at which the static pressure on the external side of the seal is greater than that on the internal side. This condition occurs when the nozzle is overexpanded and when the seal is sufficiently vectored away from the gas flow stream.

SUMMARY OF THE INVENTION

A plurality of divergent seals are located internally between a plurality of divergent flaps in a normal manner. Each seal has a longitudinal support secured to the air side. A restraint bar is secured to this support and is rotatable in the plane substantially parallel to the seal gas side surface. Each bar has two arms, one arm extending on the air side of each adjacent flap.

Each flap has on the air side a transverse track and a longitudinal track. A transverse slider is disposed on each arm of the restraint bar and it is slideably located on the transverse tracks. A longitudinal slider is located in a longitudinal track and connected to the transverse sliders with connecting links.

The connection between the transverse slider and the arm is preferably a spherical joint to better accommodate the changing angle. The apparatus should be sized to establish a preload between the seal and the flap and the connection between the arm and the flap should be capable of taking forces in either normal direction.

An odd number of flaps is preferred since this makes the arrangement theoretically determinant. However, as a practical matter, satisfactory operation will be achieved even with an even number. The linkage should also be sized to avoid any possibility of disengagement of the seal from the flaps. This should be accomplished without establishing a top dead center position which could lock up the apparatus.

BRIEF DESCRIPTION OF THE DRAWINGS

FIG. 2 is a section through a divergent seal, the seal centering restraint, and part of two adjacent flaps;

FIG. 3 is a top view showing the seal centering restraint;

FIG. 4 is a section 4—4 of FIG. 3;

DESCRIPTION OF THE PREFERRED EMBODIMENT

Figure 1:
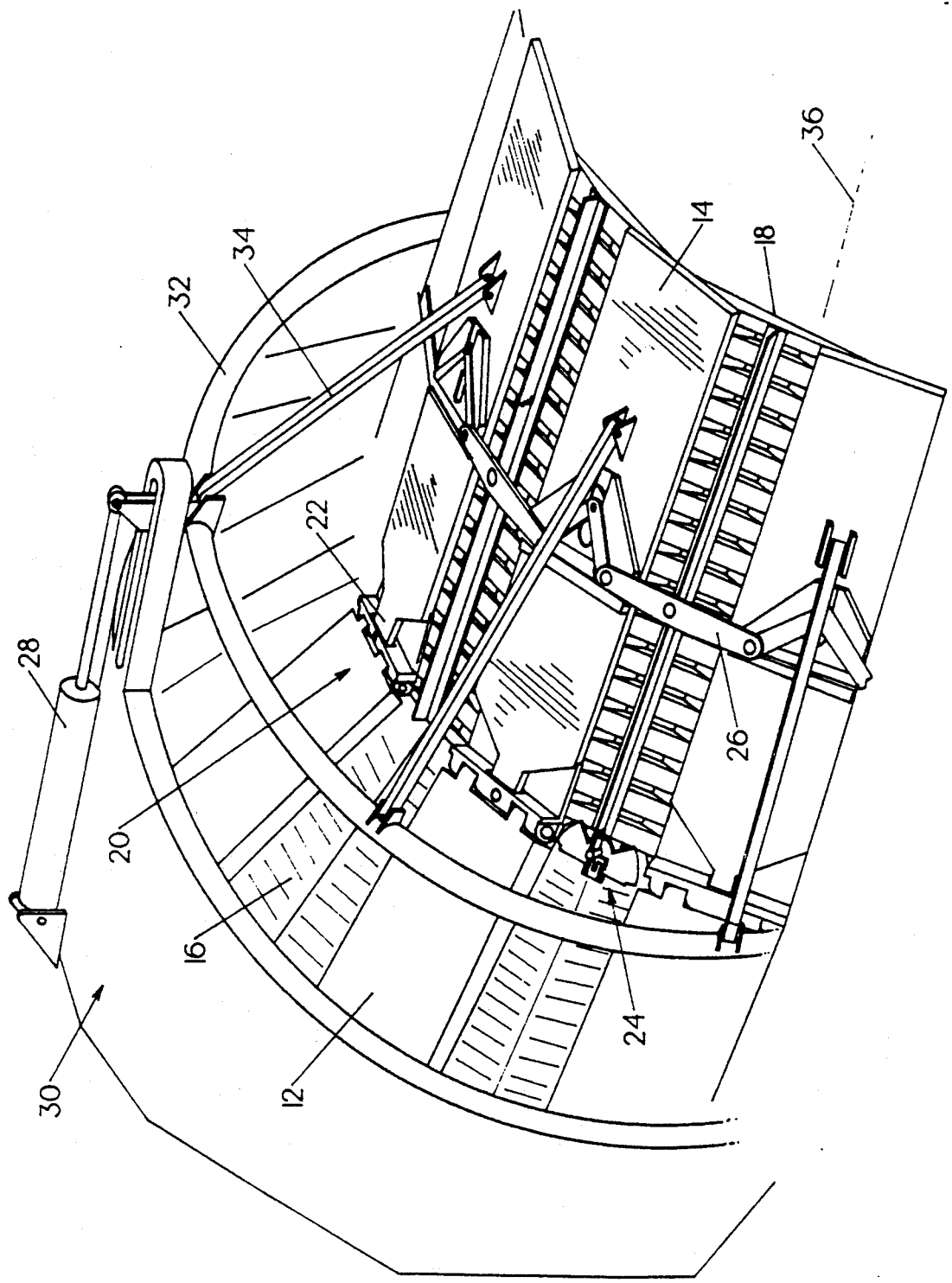
FIG. 1 is a partial isometric view of the convergent-/divergent nozzles.

FIG. 1 is a general view of convergent/divergent nozzle 10 with convergent flaps 12 and divergent flaps 14. Interposed between the flaps are convergent seals 16 and divergent seals 18.

Convergent and divergent flap hinge assembly 20 includes a divergent flap hinge seal 22. This divergent flap hinge seal overlaps divergent flap 14.

Convergent to divergent seal hinge 24 joins the convergent and divergent seals. Divergent seal centering and restraining arrangement 26 centers and restrains the divergent seals 18.

Conventional drives may be used to vary the angular position of convergent flaps 12 and convergent seals 16, thereby varying the throat opening of the nozzle. Actuator 28 operating against the static upstream structure 30 drives a sync ring 32. This sync ring is connected through drive links 34 to the divergent flaps 14. By translating ring 32 rearwardly, the exit opening is reduced. By tilting the sync ring 32, the flaps 14 are vectored with relation to the nozzle axis 36 to achieve a vectoring discharge of the nozzle. Referring to FIG. 2, divergent seal 18 is located on the gas side of flaps 14 with the seal surface 38 in contact therewith. The longitudinal support 40 in the form of a backbone is secured to the air side of the seal. This maintains the seal straight in the longitudinal direction while permitting twisting as required to maintain contact of seal surfaces 38.

Restraint bar 42 is pivotally secured to the support and is rotatable in a plane substantially parallel to the gas side seal surface 44. The bar has two arms 46 with spherical bearings 48 disposed on each end thereof.

These arms extend on the air side of the adjacent flaps and carry, through spherical bearings 48, transverse sliders 50. These fit within transverse tracks 52 located on the air side of each of the flaps.

Referring to FIG. 3, a longitudinal track 54 can be seen on each flap. Longitudinal slider 56 is located in this track and is connected to slider 50 by connecting link 58.

Figure 5A:
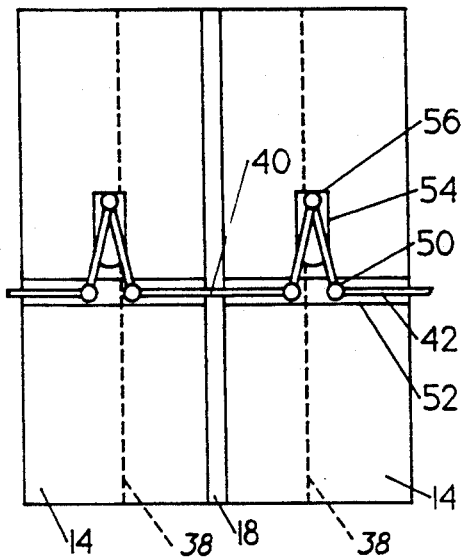
FIGS. 5a-d schematically show the linkage at various nozzle positions.
Figure 5B:
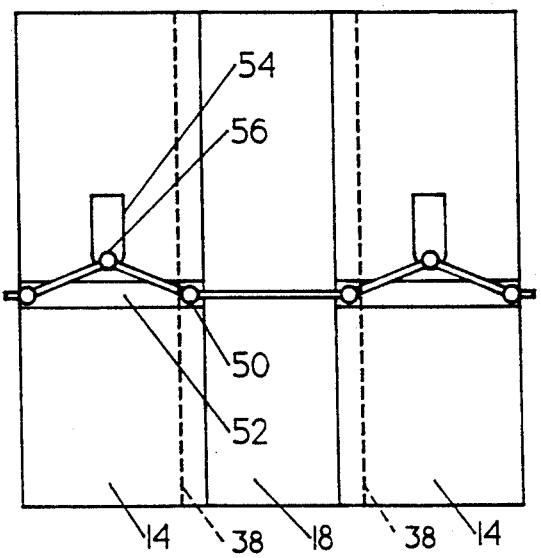

A section through track 52 is shown in FIG. 4 with the overlying portions 60 of the track interacting with extension 62 of the slider. Accordingly, force can be transferred between the arms 46 and the flap 14 in a normal direction away from the flaps as well as toward the flaps. In FIG. 5a, the linkage arrangement is schematically shown with axial nozzle thrust and minimum throat area. Slider 56 is well up in track 54 and the sliders 50 are near the center of the flap. Support 40 is located between the flaps.

In 5b a maximum throat area condition is shown. Here the slider 56 is low in the slot 54 and is blocked by being actually bottomed out at this point in the extreme condition. This limits the movement of sliders 50 within track 52. The movement of seal 18 with respect to flaps 14 is such that the seal surface 38 does not disengage in a transverse direction.

It is important that slider 56 be located away from a line between the two adjacent sliders 50. This precludes a top dead center position where the linkage could lock up. While the linkage could be blocked at the end of the track 52 instead of in track 54, the use of track 54 is preferred because of the flexibility it offers in conjunction with diagram 5d.

Figure 5D:
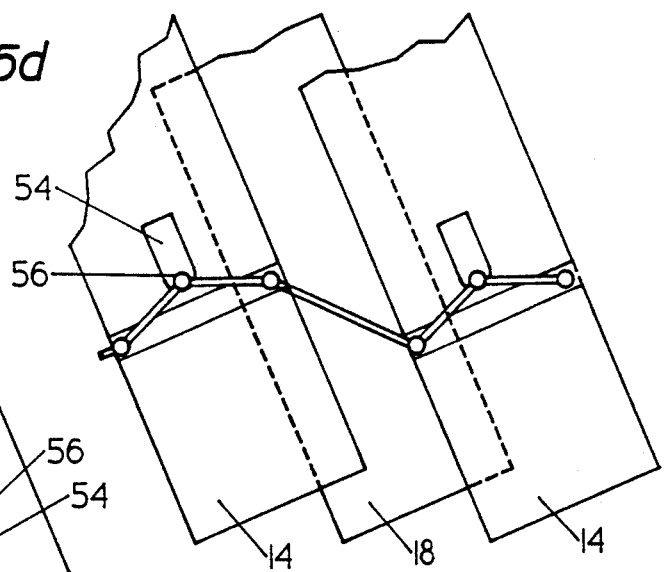
Figure 5C:
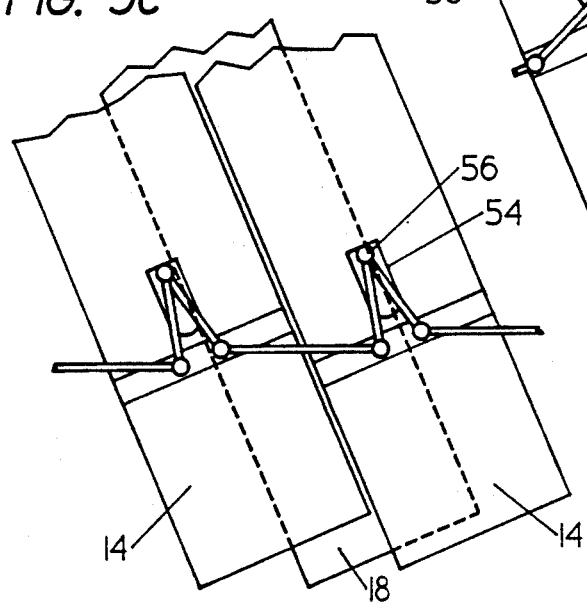

FIG. 5c illustrates a minimum throat area condition with the nozzle vector. It can be seen that the desired relationship maintaining the seal between the flaps is maintained.

FIG. 5d shows the vectored condition, this time with maximum throat area. Again, the bottoming out, of slider 56 in slot 54 precludes disengagement.

Referring again to FIG. 2, it can be seen that the flap 14 is entrapped between slider 50 and the seal 18. With the slider located in line with the seal surface 38, the thickness of the flap exists between the slider and the seal surface. Should, however, arm 46 rotate a significant amount, the slider moves inwardly, and with the flap the same angle, the distance between the slider and the seal increases. With the particular linkage described herein, there is very little inward movement of the arm compared to other linkage arrangements such as a sawtooth gate arrangement.

Figure 6:
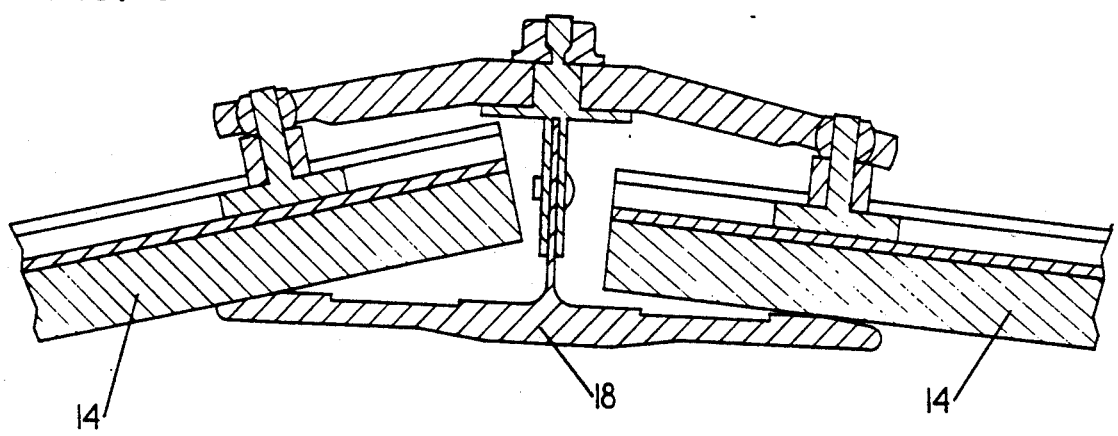
FIG. 6 shows a radial offset condition.

The sum total of dimensions perpendicular to the surface of the seal of the longitudinal support 40, the restraint bar 42, and the transverse slider 50 is such to exert a slight compressive preload between the flaps and the seal. There is sufficient flexibility within the seal to absorb the differences in movement during the slight rotation of arm 42 (FIG. 6).

The spherical joint 48 permits the slider 50 to follow track 52 regardless of the change of angle between the adjacent flaps.

I claim:

1. A vectorable convergent/divergent nozzle comprising:

a plurality of elongated vectorable circumferentially arranged divergent flaps having an inwardly facing gas side and an outwardly facing air side;

a plurality of elongated divergent seals equal in number to said plurality of flaps, each seal being disposed between adjacent flaps on the gas side thereof and each having a gas side surface and an air side;

a longitudinal support secured to the air side of each of said seals;

a restraint bar pivotally secured to each of said supports rotatable in a plane parallel to said seal gas side surface, each said bar having two arms extending on the air side of an adjacent flap;

each flap having on the air side at least one transverse track and a longitudinal track;

a transverse slider disposed on each arm of each bar and slideably located in one of said transverse tracks;

a longitudinal slider slideably located in each longitudinal track; and a connecting link connecting each transverse slider to an adjacent longitudinal slider.

2. A nozzle as in claim 1, wherein:
   said plurality of flaps being an odd number.

3. A nozzle as in claim 1, further comprising:
   a spherical joint securing each transverse slider to the arm on which it is disposed.

4. A nozzle as in claim 1, further comprising:
   said longitudinal support, said restraint bar, and said transverse slide being sized to exert a compressive preload between each pair of adjacent flaps and their corresponding seal.

5. A nozzle as in claim 1, further comprising:
   each said transverse slider being arranged to transfer a load to its corresponding flap in a normal direction both towards and away from said flap.

6. A nozzle as in claim 1, further comprising:
   one of said longitudinal slides and said transverse slides being blocked on each flap at a position precluding disengagement of said seal from an adjacent flap.

7. A nozzle as in claim 6, further comprising:
   said longitudinal slider being blocked.

* * * * *